United States Patent [19]

Weinert

[11] 4,253,427
[45] Mar. 3, 1981

[54] HEAT EXCHANGING SYSTEM

[76] Inventor: Freidrich Weinert, 219-19 131st Ave., Jamaica, N.Y. 11413

[21] Appl. No.: 84,705

[22] Filed: Oct. 15, 1979

[51] Int. Cl.³ .............................................. F22B 3/06
[52] U.S. Cl. ...................................... 122/26; 122/28; 237/8 R; 126/247
[58] Field of Search .................... 122/26, 27, 28; 126/247; 237/8 R

[56] References Cited

U.S. PATENT DOCUMENTS

| | | | |
|---|---|---|---|
| 1,819,057 | 8/1931 | Archer | 122/26 |
| 2,434,575 | 1/1948 | Marshall | 237/8 R |
| 3,198,176 | 8/1965 | Helmer | 122/26 |
| 3,341,122 | 9/1967 | Whittell, Jr. | 237/8 R |
| 3,730,265 | 5/1973 | Lawrence | 237/8 R |
| 3,822,740 | 7/1974 | Hackett | 122/26 |
| 3,922,876 | 12/1975 | Wetherington, Jr. et al. | 62/238 E |
| 4,027,631 | 6/1977 | Lavery | 122/26 |
| 4,115,027 | 9/1978 | Thomas | 126/247 |

FOREIGN PATENT DOCUMENTS 169358 9/1921 United Kingdom ..................... 126/247

Primary Examiner—Henry C. Yuen
Attorney, Agent, or Firm—Jordan and Hamburg

[57] ABSTRACT

Heat exchanging system comprises a heat expansible organic liquid, at least one pressure cell, the organic liquid being heated in the pressure cell to thereby increase temperature of the organic liquid, valve means connected to the pressure cell for controlling flow of the organic liquid into and out of the pressure cell to maintain predetermined pressure in the cell, and at least one heat exchanger connected to the pressure cell through the valve means for transferring heat of the organic liquid to another medium. The heat exchanger includes a pressure valve for spraying the organic liquid thereinto. The system further comprises cooling means for cooling the organic liquid flowing from the heat exchanger and pump means for circulating the cooled organic liquid to the pressure cell through the valve means with a relatively high pressure.

3 Claims, 6 Drawing Figures

HEAT EXCHANGING SYSTEM

REFERENCE TO DISCLOSURE DOCUMENT

This invention is the subject of Disclosure Document No. 084,185 filed Sept. 12, 1979.

BACKGROUND OF THE INVENTION

This invention relates to a heat exchanging system, more particularly a heat exchanging system utilizing a heat expansible organic liquid as a heat transfer medium to transfer heat from a heat source to another medium.

As heat transfer means, boilers are well known, but they require much energy to heat material. The heat exchanging system of the invention is superior to conventional boilers. It can heat a medium to higher temperatures by using a conventional or other heat source. Generally, it is difficult to accumulate or store heat from a heat source.

Therefore, an object of the invention is to provide a heat exchanging system for heating a medium to a higher temperature than can be accomplished by other systems starting with the same initial heat source.

Another object of the invention is to provide a heat exchanging system as stated above, which is efficient and simple.

Further objects and advantages of the invention will be apparent from the following description of the invention.

SUMMARY OF THE INVENTION

In accordance with the invention, there is provided a heat exchanging system in which heat is accumulated from a heat source particularly effectively. The heat exchanging system comprises a heat expansible organic liquid, at least one pressure cell, valve means connected to the pressure cell for controlling flow of the organic liquid into and out of the pressure cell to maintain predetermined pressure in the cell, and at least one heat exchanger connected to the pressure cell through the valve means for transferring heat of the organic liquid to another medium. The organic liquid is heated in the pressure cell to thereby increase the temperature of the organic liquid. The heat exchanger includes a pressure valve for spraying the organic liquid thereinto. The heat exchanging system further includes cooling means for cooling the organic liquid flowing from the heat exchanger, and pump means for circulating the cooled organic liquid to the pressure cell through the valve means with a relatively high pressure.

The boiling point of the heat expansible organic liquid is preferably from about 50° to about 90° C., and the heat of vaporization of the organic liquid is from about 70 cal./g to about 130 cal./g. The organic liquid is preferably toluene.

The valve means is a duplex valve, the two being connected with each other, the first valve restricting the organic liquid flowing into the pressure cell and the second valve restricting the organic liquid flowing out of the pressure cell. The valve means is generally closed by a spring, but the second valve includes a groove at a bottom part thereof to which pressure of the organic liquid in the pressure cell is applied. Accordingly, when the pressure in the pressure cell reaches a predetermined level, the second valve opens to relieve the pressure in the pressure cell to the heat exchanger. Then, the first valve opens so that the organic liquid is introduced into the pressure cell by means of the pump means. There is provided a one way valve between the first valve and the pressure cell to effect one way flow of the organic liquid from the pump means to the pressure cell.

The pressure valve situated in the heat exchanger comprises a tapered piston, a spring for biasing the piston forwardly, and a valve seat having an opening communicating with the pressure cell through the valve means and a plurality of nozzles inside the opening. When the valve means is opened due to the high pressure within the pressure cell, the organic liquid is sprayed through the nozzles into the heat exchanger. Consequently, heat accumulated in the organic liquid at the pressure cell is effectively transferred to another medium outside the heat exchanger, for example air for residential, commercial or industrial heating purposes.

Preferably, the heat exchanging system includes a storage tank between the pump means and the valve means for keeping the organic liquid therein. Inert gas at superatmospheric pressure, such as nitrogen, is applied to the storage tank so that the organic liquid sent from the pump means is returned to the pressure cell.

The heat exchanging system of the present invention is especially beneficial when it is used together with a special heating system. The heating system comprises a rotational shaft operated by natural energy, a rotor connected to the shaft, a plurality of weights slidably situated within the rotor, and a plurality of heat segments connected to the weights. The weights are slidable outwardly by centrifugal force due to the rotation of the rotor. A plurality of pressure cells is arranged around the heat segments to contact therewith when the rotor rotates. Accordingly, the organic liquid is heated in the pressure cells by friction between the heat segments and the pressure cells, and heat thus created is exchanged in each heat exchanger. The heat segments are arranged such that when the weights slide outwardly, the heat segments move inwardly to contact the pressure cells provided inside the heat segments. Preferably, a plurality of blades are connected to the shaft of the heating system for rotating the shaft by wind power.

DETAILED DESCRIPTION OF A PREFERRED EMBODIMENT

Figure 1:
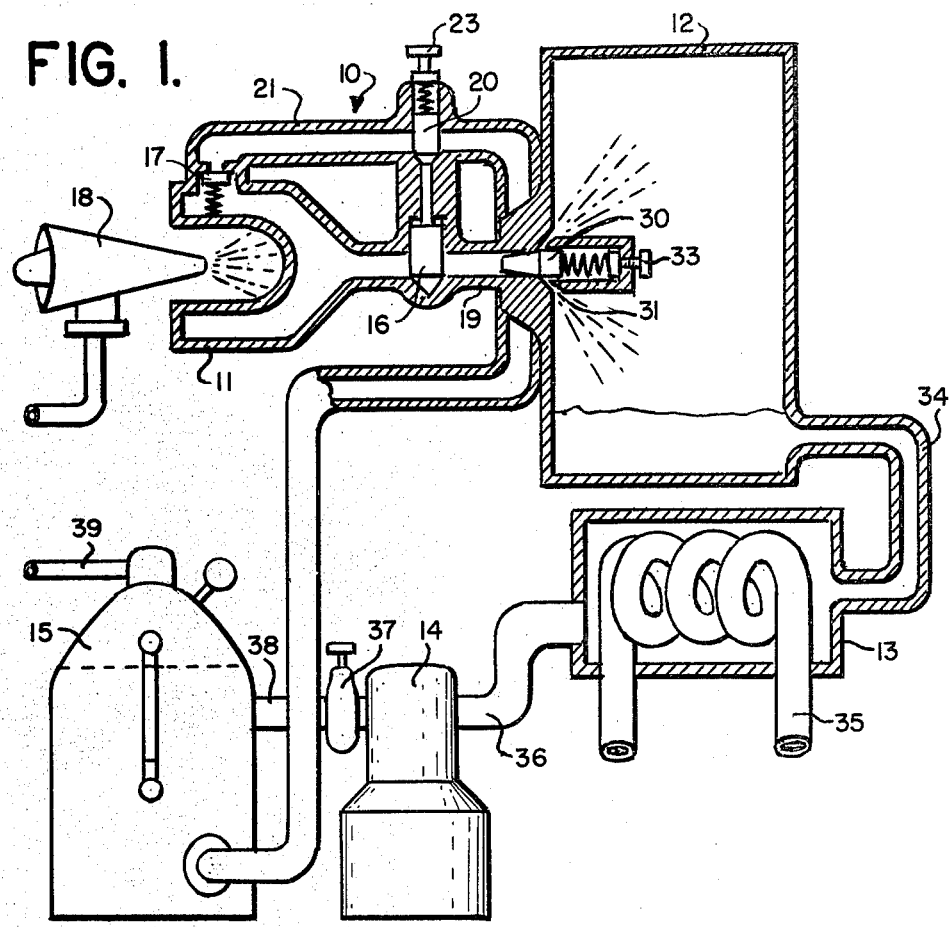
FIG. 1 is a partly sectional explanatory view of the heat exchanging system in accordance with the invention.
Figure 4:
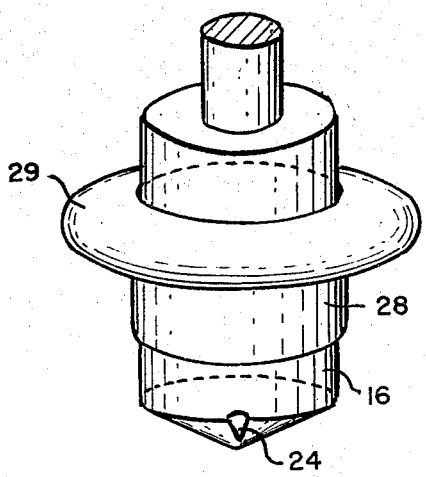
FIG. 4 is a perspective view of an outlet valve.
Figure 5:
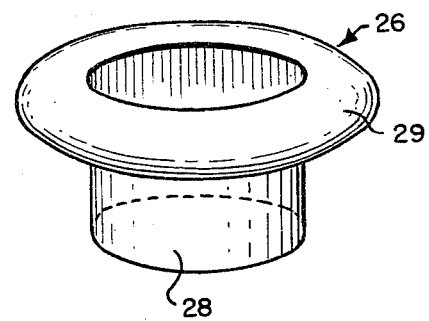
FIG. 5 is a perspective view of a sealing member.
Figure 2:
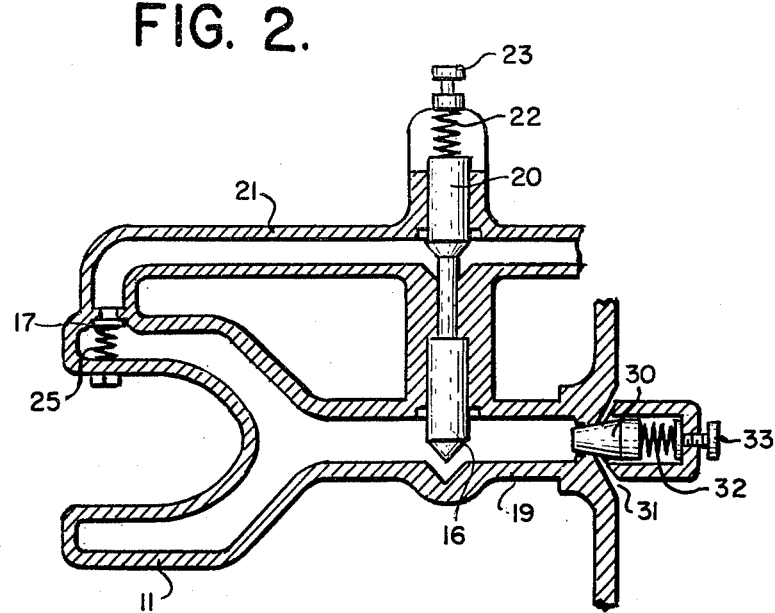
FIG. 2 is a cross section view of the valve means and pressure cell.
Figure 3:
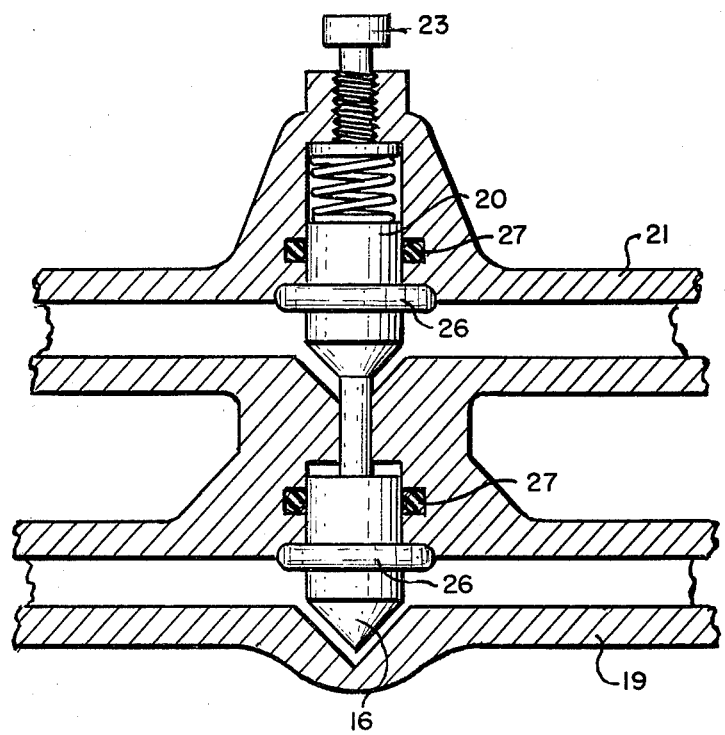
FIG. 3 is a cross section view of inlet and outlet valves.

Referring to FIG. 1, there is shown a heat exchanging system 10 of the present invention. The system 10 comprises a pressure cell 11, a heat exchanger 12, a cooling tank 13, a pump 14 and a storage tank 15, through which heat expansible organic liquid is circulated. In the embodiment, toluene is used as the heat expansible organic liquid.

The pressure cell 11 is closed by an outlet valve 16 and a one way valve 17, and the organic liquid is heated therein by a burner 18. The outlet valve 16 is situated within a pipe 19 between the pressure cell 11 and the heat exchanger 12, and is coupled with an inlet valve 20 provided within a pipe 21 between the storage tank 15 and the pressure cell 11. The valves 16, 20 are biased by a spring 22 to generally close the pipes, the force of the spring 22 being regulated by a bolt 23. The outlet valve 16 includes a groove 24 at the bottom thereof to sense the pressure in the pressure cell 11, so that when the pressure in the cell 11 exceeds the predetermined level, the outlet valve 16 moves upwardly to relieve the pressure to the heat exchanger 12. At that time, the valve 20 is also opened. However, since the one way valve 17 is provided at a junction between the pipe 21 and the pressure cell 11, and is biased by a spring 25, the heated organic liquid flows only to the heat exchanger 12. When the pressure in the pressure cell 11 lowers, the organic liquid flows into the pressure cell through the valve 20 and the one way valve 17.

A sealing member 26 and a seal ring 27 are respectively provided on the valves 16, 20. The sealing member 26 is made of a flexible material, and includes a body 28 and a round edge 29. The sealing members 26 are glued over the valves 16, 20, and the seal rings 26 are provided around valve seats of the valves 16, 20, so that the valves 16, 20 are completely sealed.

The heat exchanger 12 includes a pressure valve 30 for spraying the organic liquid flowing from the pressure cell 11 therein to effect efficient exchange of heat of the organic liquid with another medium. There are provided a plurality of nozzle openings 31 communicating with the pipe 19 in the heat exchanger 12, and the pressure valve 30 is situated to close the nozzle openings 31 by means of a spring 32. The force of the spring 32 is regulated by a bolt 33. Accordingly, when the heated organic liquid is introduced into the heat exchanger 12 through the pressure valve 30, the organic liquid is sprayed into the heat exchanger 12 and vaporized. Upon transferring its heat, the organic liquid changes to a liquid state and accumulates at the bottom of the heat exchanger 12.

The organic liquid in the heat exchanger 12 is conducted into the cooling tank 13 through a pipe 34 and is cooled by a coolant flowing through a pipe 35. The pump 14 receives the organic liquid from the cooling tank 13 through a pipe 36, and sends the organic liquid to the storage tank 15. A one way valve 37 is provided in a pipe 38 between the pump 14 and the storage tank 15. The storage tank 15 is generally kept at high pressure by gas supplied from a pipe 39, so that when the pressure in the pressure cell 11 lowers, the organic liquid is sent to the pressure cell 11 through the pipe 21 and the inlet valve 20.

Figure 6:
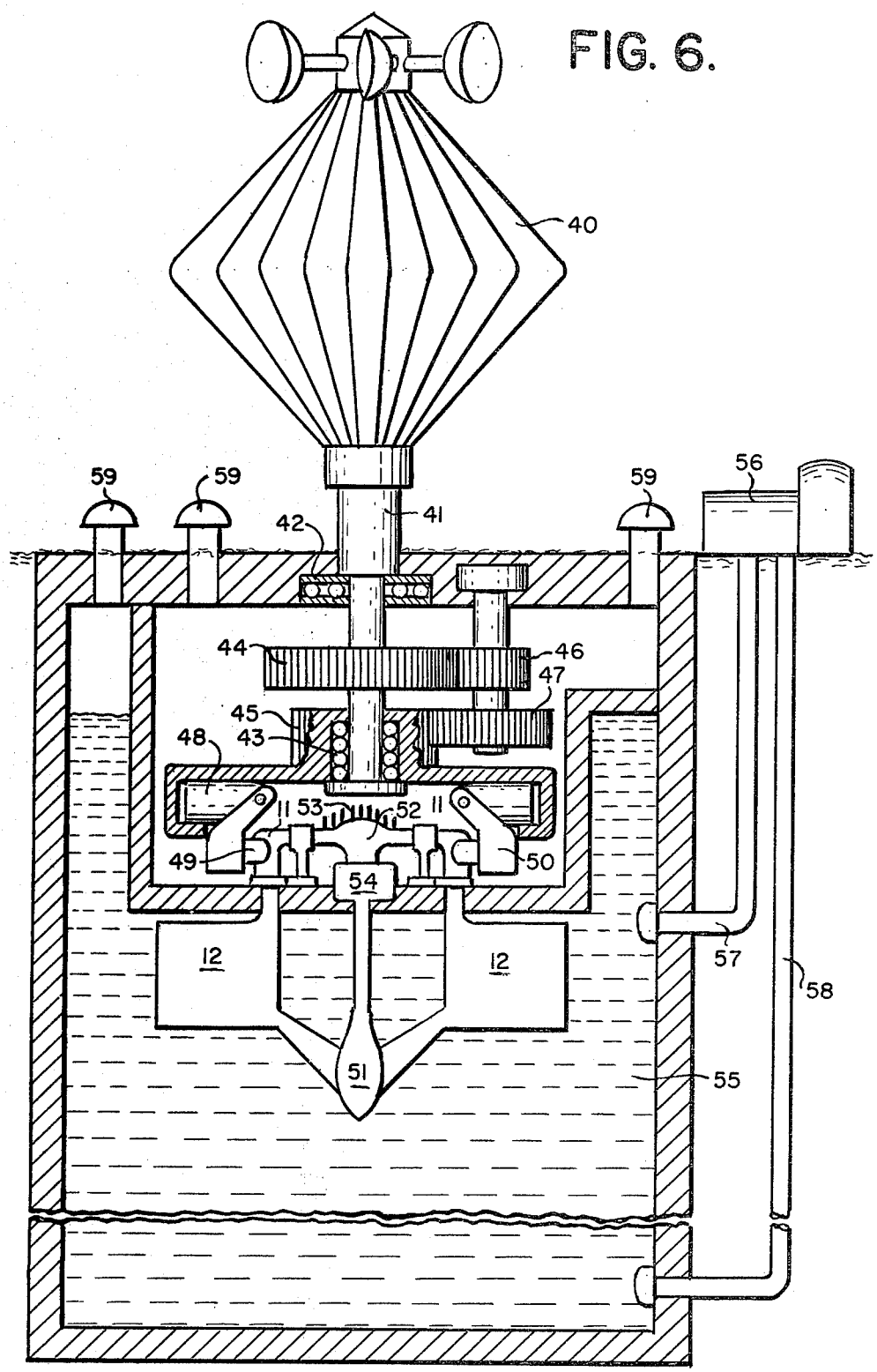
FIG. 6 is a partly sectional explanatory view of a heating system utilizing the heat exchanging system of the invention.

In FIG. 6, there is shown a heating system utilizing the heat exchanging system of the invention. In the heating system, heat for increasing the temperature of the organic liquid in the pressure cell 11 is obtained by wind power.

A plurality of blades 40 for being contacted by wind are connected to a rotational shaft 41 supported by bearings 42, 43. A gear 44 is secured to the shaft 41, and rotation of the shaft 41 is transferred to a rotor 45 through gears 46, 47 connected together. A plurality of weights 48 are slidably situated within the rotor 45 so that when the rotor 45 rotates, the weights 48 move outwardly by centrifugal force. A plurality of heat segments 49 are attached to the weights 48 by means of levers 50. The heat segments 49 move inwardly when the weights 48 move outwardly.

A plurality of pressure cells 11 are situated inside the heat segments 49. When the rotor 45 rotates to thereby move the weights 48 outwardly, the heat segments 49 contact the pressure cells 11 to create heat by friction. When the organic liquid is heated in the pressure cells 11, the organic liquid is sent to the respective heat exchanger 12 through the pressure valve 30 (not shown in FIG. 6). The organic liquid is collected in a tank 51, and is returned to a storage tank 52 having cooling fins 53 by a pump 54. The organic liquid is then distributed to each pressure cell 11 again. The valves 16, 17, 20 are attached to each pressure cell 11 as well.

In the heating system, water 55 is especially intended to be heated by the heat exchangers 12 and is continuously circulated by a pump 56 through pipes 57, 58. Ventilators 59 are attached to the system.

When expansible refrigerant is used, the reaction would be a cooling effect in the same fashion as described for the heating system, except the heat exchanger would be reversed, meaning expansible refrigerant would cool the heat exchanger and transfer heat by passing through the cooling system.

The invention has been described with reference to a specific embodiment, but it is to be noted that the description is illustrative and the invention is limited only by the appended claims.

What is claimed is:

1. Heat exchanging system comprising a heat expansible organic liquid, at least one pressure cell containing the liquid, said pressure cell being adapted to be heated to heat the organic liquid, valve means connected to said pressure cell for controlling flow of the organic liquid into and out of said pressure cell to maintain predetermined pressure in the cell, at least one heat exchanger connected to said pressure cell through said valve means for transferring heat of the organic liquid to another medium, said heat exchanger including a pressure valve for spraying the organic liquid thereinto, cooling means for cooling organic liquid flowing from the heat exchanger, and pump means for circulating the cooled organic liquid to said pressure cell through said valve means with a relatively high pressure; and a heating system, said heating system comprising a rotational shaft, means for operating said shaft by natural energy, a rotor connected to said shaft, a plurality of weights slidably situated within said rotor, said weights being slidable outwardly by centrifugal force due to the rotation of said rotor, and a plurality of heat segments connected to said weights, a plurality of pressure cells being arranged around said heat segments to contact therewith when said rotor rotates, whereby said organic liquid is heated in said pressure cells by friction between said heat segments and pressure cells, and heat thus created is exchanged in each heat exchanger.

2. The combination as claimed in claim 1, in which said heat segments are arranged such that when the weights slide outwardly, the heat segments move inwardly to contact the pressure cells provided inside the heat segments.

3. The combination as claimed in claim 2, in which said means for operating said shaft by natural energy comprise a plurality of blades connected to said shaft to rotate said shaft by wind power.

* * * * *